(12) United States Patent
Kleinsasser (10) Patent No.: US 7,975,648 B2
(45) Date of Patent: Jul. 12, 2011

(54) ANIMAL FEEDER WITH ADJUSTMENT OF A FEED DISCHARGE OPENING

(75) Inventor: Jonathan Kleinsasser, Ste. Agathe (CA)

(73) Assignee: Crystal Spring Colony Farms Ltd, Ste. Agathe, MB (CA)

( * ) Notice: Subject to any disclaimer, the term of this patent is extended or adjusted under 35 U.S.C. 154(b) by 383 days.

(21) Appl. No.: 12/356,190

(22) Filed: Jan. 20, 2009

(65) Prior Publication Data

US 2010/0180825 A1    Jul. 22, 2010

(51) Int. Cl.
    *A01K 1/10* (2006.01)
(52) U.S. Cl. .......................................... 119/53
(58) Field of Classification Search ............. 119/53, 119/53.5, 54
    See application file for complete search history.

(56) References Cited

U.S. PATENT DOCUMENTS

| | | |
|---|---|---|
| 1,719,245 A | 7/1929 | Smidley |
| 3,552,360 A | 1/1971 | Nelson |
| 4,242,985 A | 1/1981 | Freeborn |
| 4,278,049 A | 7/1981 | Van Dusseldorp |
| 4,351,274 A | 9/1982 | Pannier |
| 4,462,338 A | 7/1984 | Thibault |
| 4,660,508 A | 4/1987 | Kleinsasser |
| 5,603,285 A | 2/1997 | Kleinsasser |
| 5,967,083 A | 10/1999 | Kleinsasser |
| 6,408,787 B1 | 6/2002 | Clark |
| 6,637,368 B2 | 10/2003 | Bondarenko |
| 6,923,142 B2 | 8/2005 | Kleinsasser |
| 2003/0111018 A1* | 6/2003 | Bondarenko et al. ........ 119/53.5 |

* cited by examiner

*Primary Examiner* — Kimberly S Smith
*Assistant Examiner* — Monica Williams
(74) *Attorney, Agent, or Firm* — Adrian D. Battison; Ade & Company Inc.

(57) ABSTRACT

An animal feeder includes a hopper above a shelf onto which feed can fall to be taken by the animal or dropped into a trough below the shelf. The height of the shelf is adjustable in a course movement to move the shelf from a low height for smaller animals to a raised height for the animal after they have grown. The shelf is also adjustable in fine movement to change the width of the opening through which the feed passes to control feed rate. The shelf is carried on straps which extend along the end walls of the hopper and are movable by an adjustment linkage defined by a plate carried on the end wall and a manually adjustable lever mounted for pivotal movement on the plate. The lever has two pivot positions on the plate providing the two course adjustments and two graduated scales for the fine adjustment each cooperating with a respective pivot position.

24 Claims, 6 Drawing Sheets

ANIMAL FEEDER WITH ADJUSTMENT OF A FEED DISCHARGE OPENING

This invention relates to an animal feeder with an adjustable feed discharge opening thus adjusting the amount of feed which is allowed to pass through the opening.

BACKGROUND OF THE INVENTION

Various arrangements of animal feeder are provided in which there is a trough into which feed can be deposited from a hopper above the trough. In most cases the feed material to be deposited can vary in particle size and viscosity so that it is often desirable to provide an arrangement which allows an adjustment of the opening through which the material can feed from the hopper into the trough.

In many cases the opening is provided by a simple shutter at the gap between the Hopper and the trough where the height of the shutter can be adjusted to vary the gap at the bottom of the shutter.

In U.S. Pat. No. 4,660,508 (Kleinsasser) issued Apr. 28, 1987 is disclosed a feeder which provides a shelf above the trough with the hopper discharging onto the shelf in a manner so that the feed remains on the shelf but can be moved from the shelf to the trough by the animal as required. Feeders of this type have achieved significant commercial success. Adjustment of the height of the shelf is necessary for the purpose of accommodating different types of feed and different feed rates and this is obtained by a hand crank screw which operates with a threaded nut to raise and lower a strap carrying the shelf. The screw is used in adjustment of this device because the deposit of the feed onto the self requires an accurate adjustment of the distance between the shelf and the bottom edge of the hopper so that cruder systems with a less fine adjustment have been rejected.

In a number of US patents it is known to provide relatively crude adjustment techniques. For example the following patents provide adjustment devices; U.S. Pat. No. 1,719,245 (Smidley) issued Jul. 2, 1929, U.S. Pat. No. 3,552,360 (Nelson) issued Jan. 5, 1971, U.S. Pat. No. 4,242,985 (Freeborn) issued Jan. 6, 1981, U.S. Pat. No. 4,278,049 (Van Dusseldorp) issued Jul. 14, 1981, U.S. Pat. No. 4,351,274 (Pannier) issued Sep. 28, 1982, U.S. Pat. No. 4,462,338 (Thibault) issued Jul. 31, 1984, U.S. Pat. No. 6,408,787 (Clark) issued Jun. 25, 2002.

It is also known to provide arrangements in which adjustment in a relatively crude manner is effected by selecting one of a plurality of holes in which to locate the pin of an adjustment lever so that the adjustment is effected step by step. As the holes must be necessarily a certain distance apart, such an adjustment provides a relatively crude distance of adjustment so that the fine tuning necessary for determining the specific dimensions of an opening to accurately control the rate of flow of feed material is not possible in such a system. One example is shown in U.S. Pat. No. 6,637,368 (Bondarenko) issued Oct. 28, 2003. This provides a link which extends along one end wall of a feeder and a lever can be moved to place a pin into a selected one of a number of holes in the end wall.

U.S. Pat. No. 5,603,285 of Kleinsasser issued Feb. 18, 1997 of the present assignees discloses a further similar device where additional adjustment of the height of the shelf is possible but again fine adjustment is provided by a screw.

U.S. Pat. No. 5,967,083 also of Kleinsasser issued Oct. 19, 1999 of the present assignees discloses a further similar device where additional adjustment of the height of the shelf is possible by extending the strap using a double flap arrangement which folds up or down as required to extend the length of the strap but again fine adjustment is provided by a screw.

In U.S. Pat. No. 6,923,142 also of Kleinsasser issued Aug. 2, 2005 of the present assignees shows an arrangement which includes a hopper above a shelf onto which feed can fall to be taken by the animal or dropped into a trough below the shelf. The height of the shelf is adjustable to change the width of the opening through which the feed passes to control feed rate. The shelf is carried on straps which extend along the end walls of the hopper and are movable by an adjustment linkage defined by a plate carried on the end wall and a manually adjustable lever mounted for pivotal movement on the plate. The plate has an arcuate outer edge which is serrated to define an arcuate row of saw teeth and the lever is formed by a flat of sheet material which lies in a plane parallel to and slides over the plate and includes a portion thereof which is bent out of a plane of the lever into the plane of the plate which is also serrated with a row of saw teeth shaped to mesh with the saw teeth of the arcuate portion. The portion of the lever is movable in a direction away from the plate a non-meshing position in which the lever is free to move around the pivot axis.

However this arrangement is provided for fine adjustment of the shelf relative to the bottom edge of the hopper over a limited extent so as to control the release of the feed and the larger adjustment for setting the basic height of the shelf is carried out using the folding flap arrangement disclosed in U.S. Pat. No. 5,967,083 above.

SUMMARY OF THE INVENTION

It is one object of the invention to provide an improved feeder which allows rapid course adjustment of the height of a shelf between two or more positions and also provides fine adjustment of the opening at each of the course positions to allow a measured amount of feed.

According to one aspect of the invention there is provided an animal feeder comprising:

a hopper for containing a feed material to be dispensed to an animal for feeding therefrom;

a receptacle for receiving the feed from the hopper from which the animal can take the feed;

the hopper having components of the hopper which cooperate with the receptacle to define an opening through which the feed passes from the hopper to the receptacle so that the amount of feed discharged from the hopper to the receptacle is controlled by a width of the opening;

the receptacle and the components being mounted for course height adjustment movement between a lowered position of the receptacle and the components for animals when they are at a smaller size and at least one raised position of the receptacle and the components for the animals when they have grown to a larger size;

one of the receptacle and the components being mounted for fine height adjustment movement to control the width of the opening at both the lowered position and at said least one raised position;

and an adjustment linkage for operating course height adjustment movement and fine height adjustment movement of said one of the receptacle and the components, the linkage including:

a manually adjustable lever;

a link connected to the lever and to an element of the opening such that movement of the lever causes longitudinal movement of the link to effect adjustment of the opening;

a support for the lever such that the lever is pivotal relative to the support to cause movement off the lever to effect the movement of the link;

the lever being movable relative to the support between a first position defining said lowered position of the receptacle and the components and said at least one second position defining said at least one raised position of the receptacle and the components;

in each of the first position and said at least one second position the lever being pivotally adjustable relative to the support to cause said fine adjustment movement.

Preferably there are only two graduated scales for two pivot positions of the lever for fine adjustment at two course adjusted positions. However but this can increased simply by adding more pivot positions each associated with a graduated scale on an opposite side of the plate.

It is preferred that the adjustment of the link moves the shelf and the hopper height is adjusted by adding an insert piece which enters between the sides of the bottom neck of the hopper. However the link can adjust the hopper edge with eth shelf being adjusted manually.

Preferably the lever is movable relative to the support between the first position defining said lowered position of the receptacle and the components and the second position defining the raised position of the receptacle and the components by movement of a pivot point of the lever relative to the support.

Preferably the pivot point of the lever is moved by lifting the lever off a first pivot pin and moving the lever to a second pivot pin.

Preferably the lever co-operates in the fine adjustment movement with a graduated scale on the support.

Preferably there is provided on the support a first graduated scale for co-operation with the lever in the first position and at least one second graduated scale for co-operation with the lever in said at least one second position.

Preferably the first graduated scale is provided on one side of the support and said at least one second graduated scale on a second opposed side of the support and the pivot point of the lever is rotated in movement from the first position to the second position from one side of the support to the second side of the support.

Preferably the support comprises a plate defining a surface over which the lever moves, the surface defining an arcuate portion lying on an arc of a circle surrounding the pivot axis of the lever with the graduated scale being located on an edge of the arcuate portion.

Preferably the arcuate portion of the surface is serrated to define an arcuate row of saw teeth, the lever has a lever edge which is also serrated with a row of saw teeth shaped to mesh with the saw teeth of the arcuate portion and the lever is movable from a meshing position to a non-meshing position in which the lever is free to move around the pivot axis to move the lever and the teeth thereof along the arcuate row of saw teeth to adjust the position of the link.

Preferably the plate lies in a radial plane of the pivot axis and the arcuate row of teeth are located on an edge of the plate.

Preferably the edge of the plate is an outer edge facing radially outwardly of the axis.

Preferably the lever is formed by a flat of sheet material which lies in a plane parallel to and slides over the plate and wherein the lever includes a portion thereof which is bent out of a plane of the lever into the plane of the plate and carries the row of saw teeth of the lever on an edge thereof.

Preferably the lever is movable in a direction axial of the pivot axis to move the row of teeth thereof axially away from the plate.

Preferably the link is connected to the lever by a pin which is slidable in a slot in the support and the pin carries a spring which biases the lever into engagement with the support into said meshing position and which is compressible to allow movement of the lever to the non-meshing position and to allow movement of the lever between the first and second positions.

Preferably the support is mounted on an end wall of the hopper parallel to and spaced from the end wall.

Preferably the link comprises a strap located between the plate and the end wall.

Preferably there is provided a trough into which the feed can fall and wherein the receptacle comprises a shelf mounted above the trough arranged so that the animal can take feed from the shelf or can move the feed from the shelf to the trough.

Preferably the link is connected to the shelf for adjustment of the height thereof relative to a bottom edge of the hopper defining the opening therebetween.

According to a second more specific definition of the invention there is provided an animal feeder comprising:

a hopper for containing a feed material to be dispensed to an animal for feeding therefrom;

a shelf for receiving the feed from the hopper from which the animal can take the feed;

the hopper having components of the hopper which co-operate with the shelf to define an opening through which the feed passes from the hopper to the shelf so that the amount of feed discharged from the hopper to the shelf is controlled by a width of the opening;

the shelf being mounted for course height adjustment movement between a lowered position of the shelf for animals when they are at a smaller size and a raised position of the shelf for the animals when they have grown to a larger size;

the shelf being mounted for fine height adjustment movement to control the width of the opening at both the lowered position and the raised position;

and an adjustment linkage for operating course height adjustment movement and fine height adjustment movement of the shelf, the linkage including:

a manually adjustable lever;

a link connected to the lever and to the shelf such that movement of the lever causes longitudinal movement of the link to effect height adjustment of the shelf;

a support for the lever such that the lever is pivotal relative to the support to cause movement off the lever to effect the movement of the link;

the lever being movable relative to the support between a first position defining said lowered position of the shelf and said second position defining said raised position of the shelf;

in each of the first position and said at least one second position the lever being pivotally adjustable relative to the support to cause said fine adjustment movement.

According to a third aspect of the invention there is provided an animal feeder comprising:

a hopper for containing a feed material to be dispensed to an animal for feeding therefrom;

a shelf for receiving the feed from the hopper from which the animal can take the feed;

the hopper having components of the hopper which co-operate with the shelf to define an opening through which the feed passes from the hopper to the shelf so that the amount of feed discharged from the hopper to the shelf is controlled by a width of the opening;

the shelf being mounted for course height adjustment movement between a lowered position of the shelf for animals when they are at a smaller size and a raised position of the shelf for the animals when they have grown to a larger size;

the shelf being mounted for fine height adjustment movement to control the width of the opening at both the lowered position and the raised position;

and an adjustment linkage for operating course height adjustment movement and fine height adjustment movement of the shelf;

wherein the hopper includes a lower pivotal flap member extending along the hopper and arranged to move from a raised position to a lowered position in which it provides said components of the hopper which co-operate with the shelf in the lowered position of the shelf.

Preferably the hopper in the raised position of the flap member has a bottom edge which co-operates with the shelf in the raised position of the shelf and wherein the pivotal flap member moves from the raised position exposing the bottom edge to the lowered position in which the flap member extends downwardly from the bottom edge to define said components.

Preferably the pivotal flap member is mounted at each end on a pair of pivot levers pivotally connected to an end wall of the feeder.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The feeder shown herein is similar in construction to that shown in U.S. Pat. No. 6,923,142 of the present inventor, the disclosure of which is incorporated herein by reference.

The feeder shown herein also uses an insert piece similar in construction to that shown in U.S. Pat. No. 5,967,083 of the present inventor, the disclosure of which is incorporated herein by reference.

Figure 1:
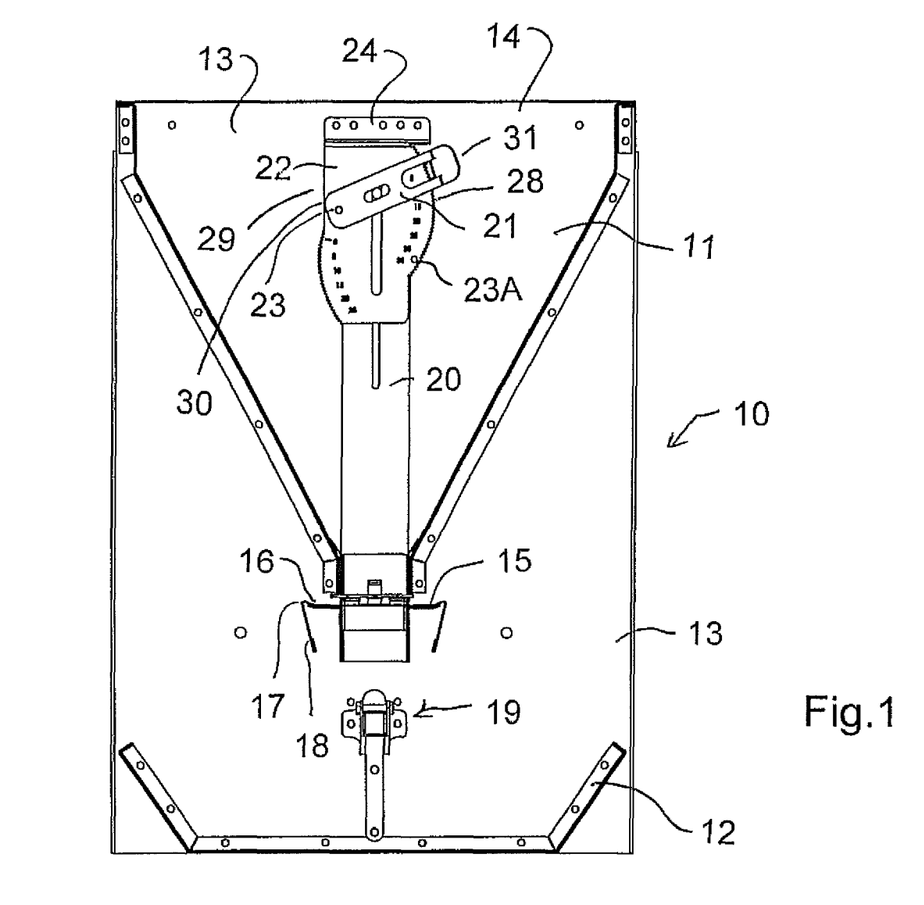
FIG. 1 is a cross sectional view through a feeder according to the present invention showing the shelf in the raised position for larger animals.

A feeder is generally indicated at 10 and includes a hopper 11 and a trough 12. The trough is connect to the hopper by end walls 13 so as to form an integral structure with generally open top 14 through which feed can be inserted for containing in the hopper and for discharge into the trough 12 for feeding by one or more animals. In the embodiment shown there is provided a shelf 15 with a generally horizontal surface 16, an upturned edge 17 and a downwardly turned lip 18 all of which are substantially as described in the above patents of Kleinsasser. Further details of the structure therefore can be obtained by reference to the above patents so that no further detailed description is necessary herein. A water supply 19 into the trough can be provided under controlled operation or operation by the animal as is known in the above patents.

The shape and arrangement of the hopper and trough can be varied and can provide either a two sided structure as shown or a single sided structure.

The height of the shelf relative to the end wall of the hopper is adjusted by raising straps 20 where each strap is arranged at a respective end of the shelf and lies along the end wall 13 parallel to the end wall. The strap is raised and lowered by a lever 21 which can be connected to a support plate 22 by on either a first pivot pin 23 or a second pivot pin 23A. The support plate 22 includes an upper mounting flange 24 which is attached to the end wall 13. A bend portion 25 is arranged at right angles to the flange portion 24 and therefore supports the plate 22 at a spaced position from the wall 13 leaving a space behind the plate 22 and inside the end wall 13. The plate 22 is formed from sheet metal which is bent and cut to form the required shape as defined above so that the plate is suspended along the end wall with a bottom edge 27 and at two side edges 28 and 29.

Figure 2:
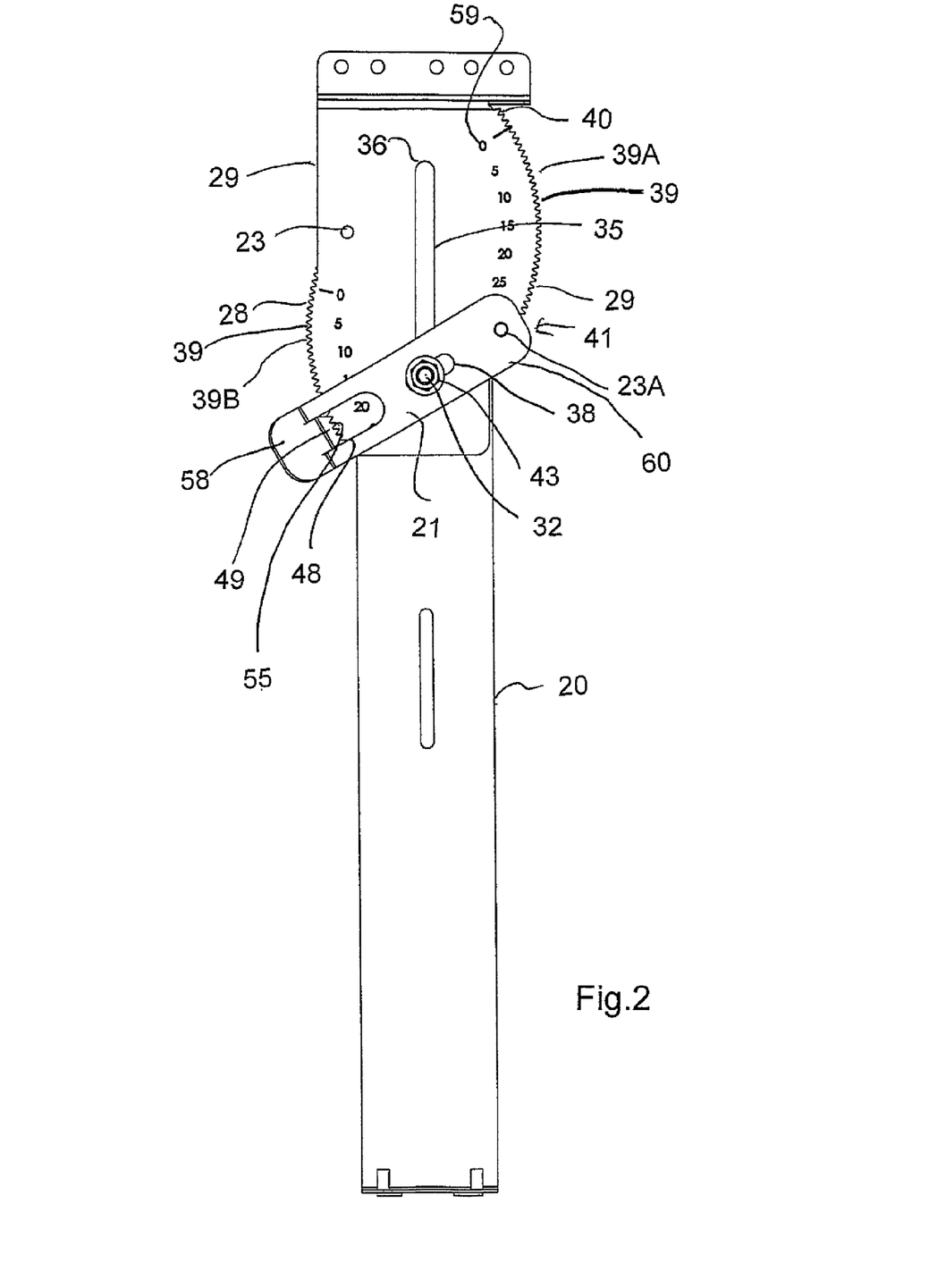
FIG. 2 is a front elevational view on an enlarged scale of the adjustment mechanism of FIG. 1 showing the shelf in the lowered position for smaller animals.
Figure 3:
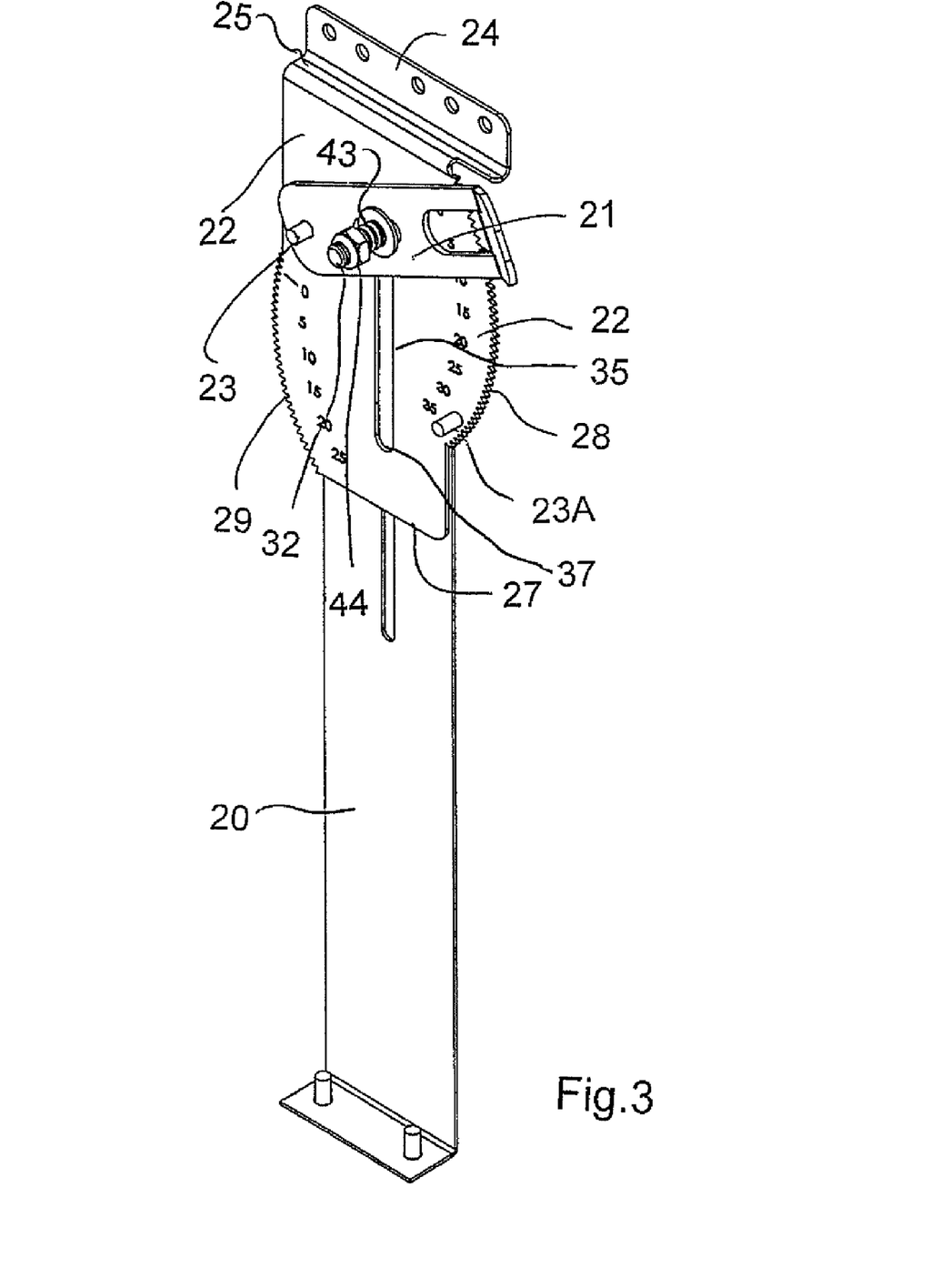
FIG. 3 is an isometric view on an enlarged scale of the adjustment mechanism of FIG. 1.
Figure 4:
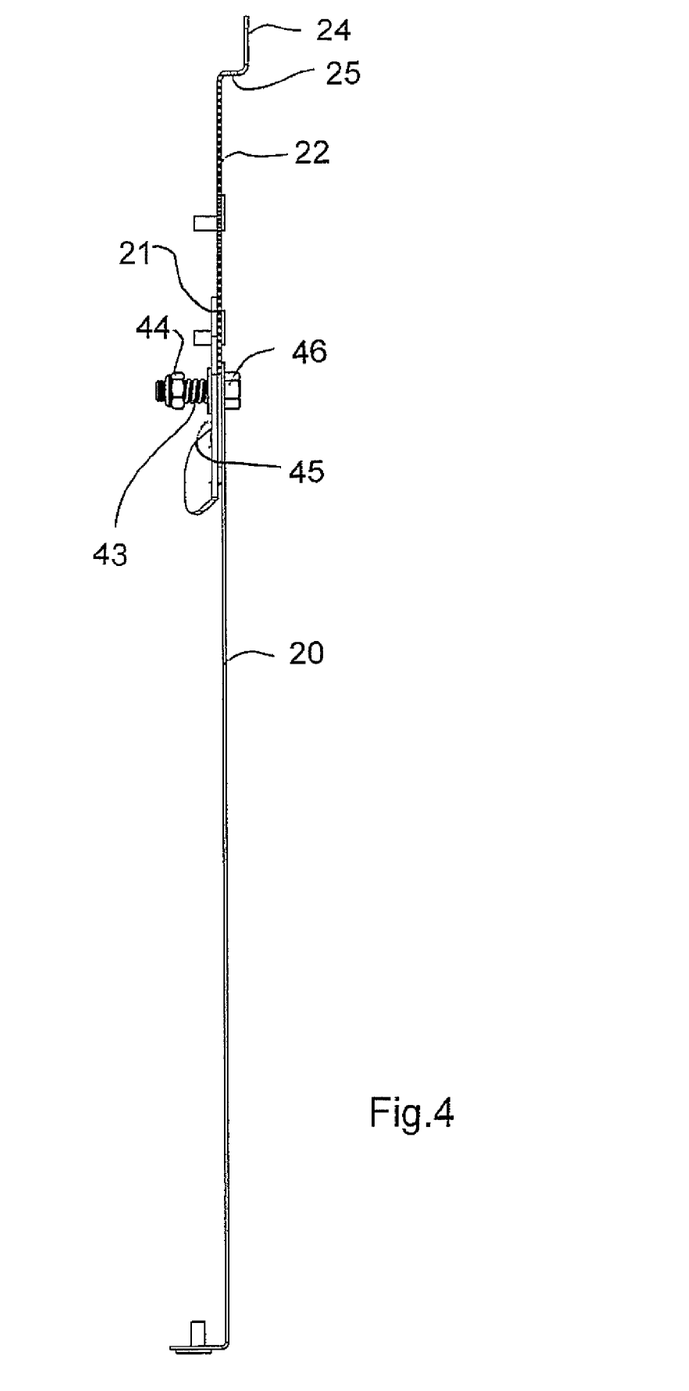
FIG. 4 is a vertical cross sectional view on an enlarged scale of the adjustment mechanism of FIG. 1.

The first pivot pin 23 is arranged adjacent the side edge 29 of the plate and the second pivot pin 23A is arranged adjacent the side edge 28 of the plate. The lever 21 is also formed of sheet metal which is stamped and punched to form a generally elongate member with an end 30 at the pivot pin 23 and a second end 31 extended beyond the edge 29 of the plate. The lever is formed of flat sheet metal similar to that of the plate so that it lies in contact with the front face of the plate. The lever 21 is attached to the strap 20 by a pin 32 which passes through a hole in the lever and a hole in the strap. A slot 35 is provided in the plate 22 which guides movement of the pin 32 so that the pin is constrained to move vertically and thus move the strap 20 vertically. The length of the slot 35 between an upper end 36 and a lower end 37 provides a length of adjustment equal the allowable movement of the lever 21. A slot 38 in the lever allows the pin to move in the vertical direction while accommodating the arcuate movement of the lever.

The plate defines a first graduated scale 39A on the edge 29 cooperating with the lever when the lever 21 is pivotally mounted on the pin 23 and a second graduated scale 39B on the edge 28 cooperating with the lever 21 when the lever is pivotally mounted on the pin 23A.

The graduated scale 39A on the edge 29 of the plate 22 faces away from the pivot axis of the pivot pin 23 and is cut to form a series of saw teeth 39 along the edge 29 from an upper edge 40 to a lower edge 41. Thus the edge 29 of the plate 22 forms an arcuate edge around the axis of the pin 23A with the saw teeth punched in the edge of the plate and facing away from the plate as a serrated edge.

In a symmetrical manner, the graduated scale 39B on the edge 28 of the plate 22 faces away from the pivot axis of the pivot pin 23A and is cut to form a series of saw teeth 39 along the edge 29 from an upper edge 40 to a lower edge 41. Thus the edge 28 of the plate 22 forms an arcuate edge around the axis of the pin 23A with the saw teeth punched in the edge of the plate and facing away from the plate as a serrated edge.

The lever 21 is held flat against the surface of the plate 22 by a spring 43 on the pin 32. The spring is held in place by a nut 44 on the pin 32 so that the spring is compressed between the nut and the outer face 45 of the lever 21. The pin 32 has a head 46 behind the strap 20. The pivot pin 23 provides enough flexibility to allow the lever 21 to be moved away from the plate 22 compressing the spring 43 against the bias of the spring 43. The lever 21 has a hole 48 formed in the lever. The lever further has a recessed portion 49 which is bent downwardly from the plane of the lever into the plane of the plate 22. Thus the recessed portion 49 is bent downwardly and is then bent to lie in the common plane with the plate 22. The portion 49 carries exposed teeth 55 at the inwardly facing edge of the recess portion 49. Thus the lever is in its normal position flat against the surface of the plate 22 thus causing the saw teeth 55 of the edge of the lever to be in meshing engagement with the saw teeth 39 of the arcuate edge of the plate. The width of the saw teeth is equal on both surfaces so that the teeth are directly meshing. The number of teeth on the edge of the lever is very much less than the number of teeth on the arcuate edge of the plate since the lever is intended to move around the arcuate edge of the plate in an adjustment movement. However the amount of adjustment is equal the pitch of the saw teeth.

The lever 21 includes an end piece 58 which is bent in a direction away from the plate 22 so as to provide a handle or tab which can be readily grasped since it is sufficiently spaced from the end wall of the feeder to be readily accessible by the hand of the user.

Markings 59 are provided on the plate counting the number of saw teeth and numbered from zero at one end through to the total number at the other end of the arcuate edge of the plate. The hole 48 allows viewing of the markings through the hole onto the front surface of the plate so that the user can line up a centre line of the hole with a selected one of the markings.

In operation the meshing saw teeth arrangement of the lever and the plate allow a fine adjustment, bearing in mind that the saw teeth have a relatively fine pitch and bearing in mind that the distance of the pin 32 from the axis of the pivot pin 23 or 23A is significantly less than the distance of the saw teeth from the pivot axis. Thus movement of one pitch of one saw tooth can be arranged to provide a movement of the shelf of a distance of the order of 1/32 to 1/16 inch.

The lever can be moved from a pivotal movement on the pin 23 to a pivotal movement on the pin 23A by lifting the rear end 60 of the lever away from the plate against the action of the spring 43 and by dropping the rear end onto the selected one of the two pins. It will be appreciated that the changing of the pivot location acts to move the lever and the strap carried thereby downwardly by a distance equal to the vertical distance between the two pins thus providing a course adjustment movement of the shelf between the lowered position for younger or //weanling pigs and a raised position for the pigs after they have grown to a larger size. In each position the lever co-operates with the associated one of the graduated scales for fine adjustment.

In one arrangement (not shown), the bottom edge of the hopper is adjusted by an insert piece similar in construction to that shown in FIG. 7 of U.S. Pat. No. 5,967,083 of the present inventor with only difference that this is divided into separate pieces at longitudinally spaced positions so that the pieces can be inserted into place in the hopper despite the presence of the straps and the levers and the support plates at each end wall of the hopper. The number of pieces can be two or can be more in longer feeders.

Figure 5:
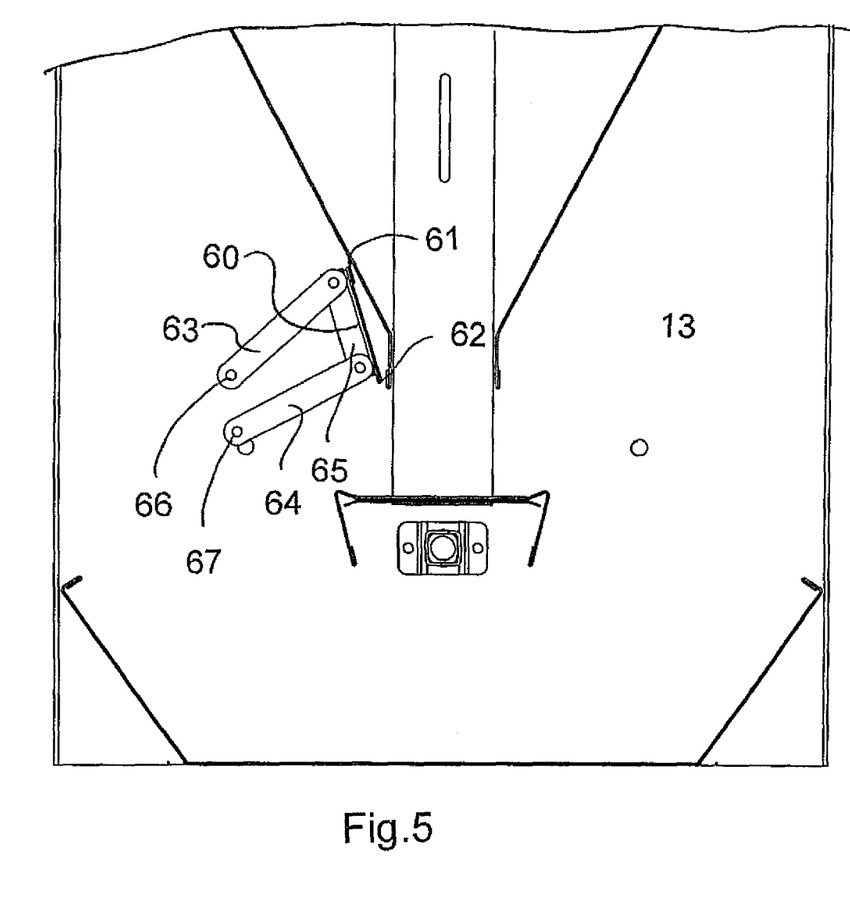
FIG. 5 is a vertical cross sectional view showing on an enlarged scale an adjustment flap member for defining a bottom edge of the hopper in the lowered position of the shelf in the feeder of FIG. 1, the flap member being shown in the raised position.
Figure 6:
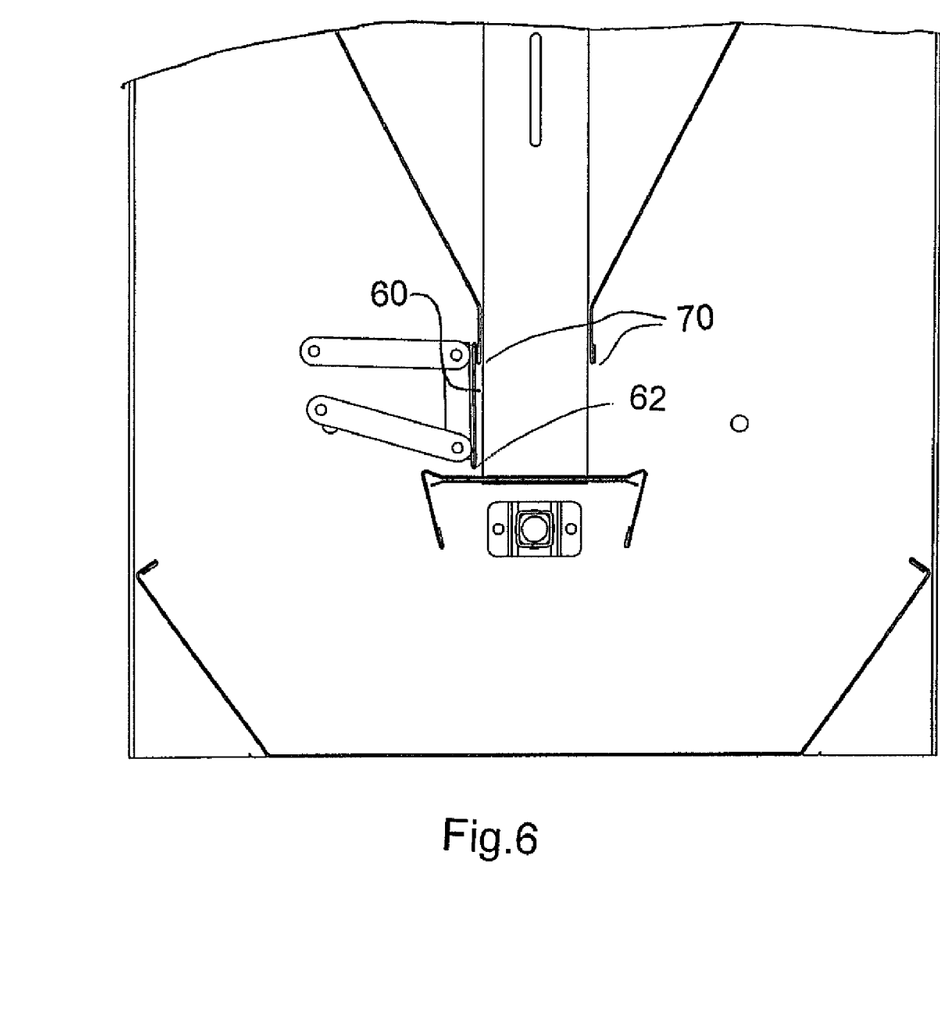
FIG. 6 is a vertical cross sectional view similar to that of FIG. 5 showing the flap member in the raised position.

In another arrangement shown in FIGS. 5 and 6, the hopper includes a lower pivotal flap member 60 extending along the hopper between the end walls 13. The flap member is in the form of a flat plate with a top edge 61 and a bottom edge 62. The flap member is mounted at each end on the respective end wall 13. The flap member is mounted on a pair of pivot levers 63 and 64 each pivotally connected at one end to a rear flange 65 of the flap member and at the other end to the end wall 13 of the feeder at a respective pivot pin 66, 67. Thus the flap member is arranged to move from a raised position shown in FIG. 5 to a lowered position shown in FIG. 6.

In the raised position of the flap member the hopper itself has a bottom edge 70 which co-operates with the shelf in the raised position of the shelf. In this position, the pivotal flap member moves into its raised position exposing the bottom edge 70 where the flap member is out of the way along the outside of the hopper. In the lowered position, the flap member extends vertically downwardly from the bottom edge 70 so that the bottom edge 62 of the flap member in effect operates as the bottom edge of the hopper and the flap member acts as an extension of the bottom of the hopper. Although only one flap member is shown for convenience, there are two parallel cooperating flap members one on each side of the bottom edges 70 and defining in effect an extension of the parallel lower neck of the hopper. The flap member is arranged to co-operate with the hopper so as to provide a seal between the bottom edge 70 and the top edge of the flap member to prevent the escape of the feed material. At the ends the flap member is sufficiently close to the end walls 13 to prevent the escape of material. A suitable locking arrangement (not shown) is provided to hold the flap member in its raised and lowered position to prevent the pigs from activating movement of the flap member to cause damage or inadvertent release of feed material.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An animal feeder comprising:
   a hopper for containing a feed material to be dispensed to an animal for feeding therefrom;
   a receptacle for receiving the feed from the hopper from which the animal can take the feed;
   the hopper having components of the hopper which co-operate with the receptacle to define an opening through which the feed passes from the hopper to the receptacle so that the amount of feed discharged from the hopper to the receptacle is controlled by a width of the opening;
   the receptacle and the components being mounted for course height adjustment movement between a lowered position of the receptacle and the components for animals when they are at a smaller size and at least one raised position of the receptacle and the components for the animals when they have grown to a larger size;
   one of the receptacle and the components being mounted for fine height adjustment movement to control the width of the opening at both the lowered position and at said least one raised position;
   and an adjustment linkage for operating course height adjustment movement and fine height adjustment movement of said one of the receptacle and the components, the linkage including:
   a manually adjustable lever;
   a link connected to the lever and to an element of the opening such that movement of the lever causes longitudinal movement of the fink to effect adjustment of the opening;
   a support for the lever such that the lever is pivotal relative to the support to cause movement off the lever to effect the movement of the link;
   the support defining first and second spaced pivot points for the lever;
   the lever being movable relative to the support between the first pivot point of the lever on the support defining said lowered position of the receptacle and the components and said second pivot point of the lever on the support defining said at least one raised position of the receptacle and the components;

at the first pivot point the lever being pivotally adjustable relative to the support to cause a first fine adjustment movement;

and at the second pivot point the lever being pivotally adjustable relative to the support to cause a second fine adjustment movement.

2. The feeder according to claim 1 wherein the pivot point of the lever is moved by lifting the lever off a first pivot pin and moving the lever to a second pivot pin.

3. The feeder according to claim 1 wherein the lever co-operates in the fine adjustment movement with a graduated scale on the support.

4. The feeder according to claim 1 wherein the support comprises a plate defining a surface over which the lever moves, the surface defining an arcuate portion lying on an arc of a circle surrounding the pivot axis of the lever with the graduated scale being located on an edge of the arcuate portion.

5. The feeder according to claim 4 wherein the arcuate portion of the surface is serrated to define an arcuate row of saw teeth, the lever has a lever edge which is also serrated with a row of saw teeth shaped to mesh with the saw teeth of the arcuate portion and the lever is movable from a meshing position to a non-meshing position in which the lever is free to move around the pivot axis to move the lever and the teeth thereof along the arcuate row of saw teeth to adjust the position of the link.

6. The feeder according to claim 5 wherein the plate lies in a radial plane of the pivot axis and the arcuate row of teeth are located on an edge of the plate.

7. The feeder according to claim 6 wherein the edge of the plate is an outer edge facing radially outwardly of the axis.

8. The feeder according to claim 6 wherein the lever is formed by a flat of sheet material which lies in a plane parallel to and slides over the plate and wherein the lever includes a portion thereof which is bent out of a plane of the lever into the plane of the plate and carries the row of saw teeth of the lever on an edge thereof.

9. The feeder according to claim 8 wherein the lever is movable in a direction axial of the pivot axis to move the row of teeth thereof axially away from the plate.

10. The feeder according to claim 5 wherein the link is connected to the lever by a pin which is slidable in a slot in the support and the pin carries a spring which biases the lever into engagement with the support into said meshing position and which is compressible to allow movement of the lever to the non-meshing position and to allow movement of the lever between the first and second positions.

11. The feeder according to claim 1 wherein the support is mounted on an end wall of the hopper parallel to and spaced from the end wall.

12. The feeder according to claim 11 wherein the link comprises a strap located between the plate and the end wall.

13. The feeder according to claim 1 wherein there is provided a trough into which the feed can fall and wherein the receptacle comprises a shelf mounted above the trough arranged so that the animal can take feed from the shelf or can move the feed from the shelf to the trough.

14. The feeder according to claim 13 wherein the link is connected to the shelf for adjustment of the height thereof relative to a bottom edge of the hopper defining the opening therebetween.

15. An animal feeder comprising:
a hopper for containing a feed material to be dispensed to an animal for feeding therefrom;
a receptacle for receiving the feed from the hopper from which the animal can take the feed;
the hopper having components of the hopper which co-operate with the receptacle to define an opening through which the feed passes from the hopper to the receptacle so that the amount of feed discharged from the hopper to the receptacle is controlled by a width of the opening;
the receptacle and the components being mounted for course height adjustment movement between a lowered position of the receptacle and the components for animals when they are at a smaller size and at least one raised position of the receptacle and the components for the animals when they have grown to a larger size;
one of the receptacle and the components being mounted for fine height adjustment movement to control the width of the opening at both the lowered position and at said least one raised position;
and an adjustment linkage for operating course height adjustment movement and fine height adjustment movement of said one of the receptacle and the components, the linkage including:
a manually adjustable lever;
a link connected to the lever and to an element of the opening such that movement of the lever causes longitudinal movement of the link to effect adjustment of the opening;
a support for the lever such that the lever is pivotal relative to the support to cause movement off the lever to effect the movement of the link;
the lever being movable relative to the support between a first position defining said lowered position of the receptacle and the components and at least one second position defining said at least one raised position of the receptacle and the components;
in the first position the lever being pivotally adjustable relative to the support to cause a first fine adjustment movement;
and in said at least one second position the lever being pivotally adjustable relative to the support to cause a second fine adjustment movement;
wherein there is provided on the support a first graduated scale for co-operation with the lever in the first position and at least one second graduated scale for co-operation with the lever in said at least one second position.

16. The feeder according to claim 15 wherein the first graduated scale is provided on one side of the support and said at least one second graduated scale on a second opposed side of the support and the pivot point of the lever is rotated in movement from the first position to the second position from one side of the support to the second side of the support.

17. An animal feeder comprising:
a hopper for containing a feed material to be dispensed to an animal for feeding therefrom;
a shelf for receiving the feed from the hopper from which the animal can take the feed;
the hopper having components of the hopper which co-operate with the shelf to define an opening through which the feed passes from the hopper to the shelf so that the amount of feed discharged from the hopper to the shelf is controlled by a width of the opening;
the shelf being mounted for course height adjustment movement between a lowered position of the shelf for animals when they are at a smaller size and a raised position of the shelf for the animals when they have grown to a larger size;

the shelf being mounted for fine height adjustment movement to control the width of the opening at both the lowered position and the raised position;

and an adjustment linkage for operating course height adjustment movement and fine height adjustment movement of the shelf, the linkage including:

a manually adjustable lever;

a link connected to the lever and to the shelf such that movement of the lever causes longitudinal movement of the link to effect height adjustment of the shelf;

a support for the lever such that the lever is pivotal relative to the support to cause movement off the lever to effect the movement of the link;

the support defining first and second spaced pivot points for the lever;

the lever being movable relative to the support between the first pivot point of the lever on the support defining said lowered position of the receptacle and the components and said second pivot point of the lever on the support defining said at least one raised position of the receptacle and the components;

at the first pivot point the lever being pivotally adjustable relative to the support to cause a first fine adjustment movement;

and at the second pivot point the lever being pivotally adjustable relative to the support to cause a second fine adjustment movement.

18. The feeder according to claim 17 wherein the pivot point of the lever is moved by lifting the lever off a first pivot pin and moving the lever to a second pivot pin.

19. The feeder according to claim 17 wherein the lever co-operates, in the fine adjustment movement, at the first pivot point with a first graduated scale on the support and at the second pivot position with a second graduated scale on the support.

20. The feeder according to claim 19 wherein the first graduated scale is provided on one side of the support and the second graduated scale is provided on a second opposed side of the support.

21. The feeder according to claim 17 wherein there is provided a pivotal flap member extending along the shelf;

the pivotal flap member being mounted for movement between a raised position of the flap and a lowered position of the flap;

the pivotal flap member being arranged such that, in the lowered position of the flap, the pivotal flap extends between the lower edge of the hopper and the shelf in the lowered position of the shelf such that a lower edge of the pivotal flap member extends along the shelf and co-operates with the shelf in the lowered position of the shelf to define an opening through which the feed passes from the hopper to the shelf so that the amount of feed discharged from the hopper to the shelf is controlled by a width of the opening;

the pivotal flap member being arranged such that, in the raised position of the flap member, the pivotal flap member is moved away from the shelf outside of the hopper and alongside the hopper;

the hopper having a lower edge of the hopper extending along the shelf which, in the raised position of the flap member, co-operates with the shelf in the raised position of the shelf to define an opening through which the feed passes from the hopper to the shelf so that the amount of feed discharged from the hopper to the shelf is controlled by a width of the opening.

22. The feeder according to claim 21 wherein each end of the pivotal flap member is mounted on a respective one of two pairs of pivot levers with each pair pivotally connected to a respective one of two end walls of the feeder.

23. An animal feeder comprising:

a hopper for containing a feed material to be dispensed to an animal for feeding therefrom;

a shelf for receiving the feed from the hopper from which the animal can take the feed;

the shelf being mounted for course height adjustment movement between a lowered position of the shelf for animals when they are at a smaller size and a raised position of the shelf for the animals when they have grown to a larger size;

the shelf being mounted for fine height adjustment movement to control the width of the opening at both the lowered position and the raised position;

an adjustment linkage for operating course height adjustment movement and fine height adjustment movement of the shelf;

and a pivotal flap member extending along the shelf;

the pivotal flap member being mounted for movement between a raised position of the flap and a lowered position of the flap;

the pivotal flap member being arranged such that, in the lowered position of the flap, the pivotal flap extends between the lower edge of the hopper and the shelf in the lowered position of the shelf such that a lower edge of the pivotal flap member extends along the shelf and co-operates with the shelf in the lowered position of the shelf to define an opening through which the feed passes from the hopper to the shelf so that the amount of feed discharged from the hopper to the shelf is controlled by a width of the opening;

the pivotal flap member being arranged such that, in the raised position of the flap member, the pivotal flap member is moved away from the shelf outside of the hopper and alongside the hopper;

the hopper having a lower edge of the hopper extending along the shelf which, in the raised position of the flap member, co-operates with the shelf in the raised position of the shelf to define an opening through which the feed passes from the hopper to the shelf so that the amount of feed discharged from the hopper to the shelf is controlled by a width of the opening.

24. The feeder according to claim 23 wherein each end of the pivotal flap member is mounted on a respective one of two pairs of pivot levers with each pair pivotally connected to a respective one of two end walls of the feeder.

* * * * *